(No Model.)

F. HOPKINS.
Eyeglass.

No. 235,436. Patented Dec. 14, 1880.

WITNESSES:
Henry N. Miller
C. Sedgwick

INVENTOR:
F. Hopkins
BY Munn & Co
ATTORNEYS.

UNITED STATES PATENT OFFICE.

FRANCIS HOPKINS, OF NEW YORK, N. Y.

EYEGLASSES.

SPECIFICATION forming part of Letters Patent No. 235,436, dated December 14, 1880.

Application filed May 5, 1880. (No model.)

*To all whom it may concern:*

Be it known that I, FRANCIS HOPKINS, of the city, county, and State of New York, have invented a new and useful Improvement in Eyeglasses, of which the following is a specification.

The object of this invention is to give eyeglasses a firmer gripe upon the nose without tightening the spring, to prevent the glasses from slipping forward on the nose, and to hold them on the nose nearer and on the same plane with the eyes.

Figure 1:
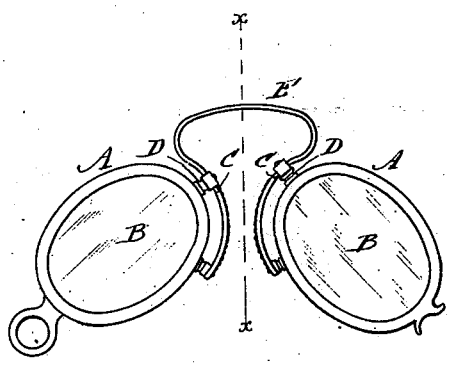
Figure 2:
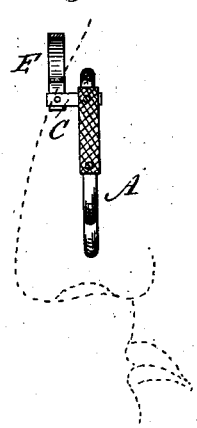

Figure 1 is a front elevation of a pair of eyeglasses, showing the device attached. Fig. 2 is a sectional elevation of the same on line $x$ $x$, Fig. 1.

Similar letters of reference indicate corresponding parts.

In the drawings, A A represent the frames of the lenses B B. C C are arms that are firmly secured to the studs D D, which project from the inner edges of the frames A A, said arms C C being made to project forward to any desired distance at right angles with the frames of the lenses B B. E is the usual eyeglass-spring, having its ends secured in or upon the outer ends of the arms C C, so as to be in a plane parallel, or nearly so, with the planes of said lenses B B.

The location of the spring in ordinary eyeglasses is such that it presses against the nose and tips the glasses forward, thereby disarranging the focus and carrying the lenses too far from the eyes. This objection is avoided by the device herein shown.

Having thus fully described my invention, I claim as new and desire to secure by Letters Patent—

In an eyeglass, the combination, with the frames A A, of the forward-projecting arms C C and attached spring E, substantially as herein shown and described.

FRANCIS HOPKINS.

Witnesses:
 Mrs. FANNIE E. DAVIDSON,
 GEO. M. KEEF.